United States Patent [19]
Ueno et al.

[11] Patent Number: 6,014,309
[45] Date of Patent: Jan. 11, 2000

[54] LAMINATED CERAMIC ELECTRONIC PARTS

[75] Inventors: Yasushi Ueno, Takefu; Yoshikazu Takagi, Sabae; Kazuaki Kawabata, Fukui; Nagato Omori, Takefu, all of Japan

[73] Assignee: Murata Manufacturing Co., Ltd., Japan

[21] Appl. No.: 09/075,668

[22] Filed: May 11, 1998

[30] Foreign Application Priority Data

May 9, 1997 [JP] Japan .................................. 9-135823

[51] Int. Cl.[7] .............................. H01G 4/228; H01G 4/06
[52] U.S. Cl. ................... 361/306.3; 361/311; 361/321.2; 361/321.5
[58] Field of Search .................................. 361/301.1, 303, 361/305, 306.3, 311–313, 321.1–321.5, 320; 501/134–138; 29/25–42; 338/20, 21

[56] References Cited

U.S. PATENT DOCUMENTS

| | | | |
|---|---|---|---|
| 5,014,158 | 5/1991 | Nishimura et al. | 361/321.4 |
| 5,036,425 | 7/1991 | Omori et al. | 361/321.4 |
| 5,072,329 | 12/1991 | Galvagni | 361/321.2 |
| 5,117,326 | 5/1992 | Sano et al. | 361/321.4 |
| 5,757,610 | 5/1998 | Wada et al. | 361/311 |
| 5,933,315 | 8/1999 | Yamana | 361/305 |
| 5,933,318 | 8/1999 | Tomono et al. | 361/323 |

*Primary Examiner*—Dean A. Reichard
*Assistant Examiner*—Anthony Dinkins
*Attorney, Agent, or Firm*—Ostrolenk, Faber, Gerb & Soffen, LLP

[57] ABSTRACT

There is provided a highly reliable laminated ceramic electronic part in which delamination or crack can be suppressed from occurring during a sintering process even if a number of lamination of internal electrodes is increased and a thickness of the ceramic layer is reduced and which excels in thermal shock resistance. The laminated ceramic electronic part is constructed so as to satisfy the following requirements of that a thickness of the ceramic layer is 10 $\mu$m or less; a number of lamination of the internal electrodes is 200 or more; a ratio of a thickness of the internal electrode to the thickness of the ceramic layer (thickness of internal electrode/thickness of ceramic layer) is 0.10 to 0.40; and a ratio of a volume of the internal electrode to a volume of the ceramic element (volume of internal electrodes/volume of ceramic element) is 0.10 to 0.30.

3 Claims, 1 Drawing Sheet

LAMINATED CERAMIC ELECTRONIC PARTS

BACKGROUND OF THE INVENTION

1. Field of the Invention

The present invention relates to laminated ceramic electronic parts and more specifically to laminated ceramic electronic parts such as a laminated ceramic capacitor and a laminated varistor having a structure in which a plurality of internal electrodes are disposed so as to overlap each other via ceramic layers within a ceramic element composing the electronic part.

2. Description of Related Art

A typical laminated ceramic electronic part in the form of a surface mounted laminated ceramic capacitor is shown in FIG. 2. Capacitor 23 is constructed by disposing a pair of external terminals 24a and 24b, which are in electrical contact with a plurality of internal electrodes 22, at opposite ends of a ceramic dielectric block 21. The dielectric block 21 is formed of a lamination of thin ceramic layers 21a having the internal electrodes 22 disposed therebetween. This laminated structure makes it possible to obtain a large capacitance even though the overall size of the capacitor 22 is small.

Due to improvements in the ability to decrease the thickness of the ceramic layers 21a, it has become possible to both reduce the thickness of the ceramic layers 21a and increase the total number of internal electrodes 21a while at the same time decreasing the overall size of the capacitor 23 (or other laminated ceramic electronic part). Laminated ceramic parts having over 100 laminated ceramic layers, each as thin as 5 $\mu$m, have become commercially available.

While the reduction in the size of the laminated layers has improved the characteristics of the final product (reduced size and capacitance), it has created manufacturing problems. As a result of the thinning of the ceramic layers, there is little difference between the thickness of the ceramic layers and the thickness of the internal electrodes and the ratio of the combined thickness of the internal electrodes to the total thickness of the electronic part can exceed 3.0. Because the internal electrodes have become a larger percentage of the overall electronic part, they have a much greater effect on the sintering characteristics of the product.

This has the disadvantageous effect of increasing the incidence of delamination and cracking during the sintering process, thus increasing the occurrence of defective parts and degrading the reliability of the parts. Additionally, the laminated ceramic electronic part is likely to form cracks when it receives thermal shocks.

SUMMARY OF THE INVENTION

Accordingly, it is an object of the present invention to solve the above-mentioned problems by providing highly reliable laminated ceramic electronic parts in which delamination or cracking can be suppressed during the sintering process and which excels in thermal shock resistance even if the number of internal electrodes is increased and the thickness of the individual ceramic layer (located between the internal electrodes) is reduced.

In order to achieve the above-mentioned object, the present invention includes a ceramic electronic part having a structure in which a plurality of internal electrodes are disposed so as to overlap each other via respective ceramic layers and the internal electrodes are led to terminals on the opposite sides of the ceramic element and in which each layer satisfies the following requirements:

(a) the thickness of each respective ceramic layer is 10 $\mu$m or less;

(b) the number of internal electrodes is 200 or more;

(c) the ratio of the thickness of the internal electrodes to the thickness of the ceramic layers (thickness of internal electrode/thickness of ceramic layer) is between 0.10 and 0.40; and (d) the ratio (volume of internal electrode/volume of ceramic element) of the total volume of the internal electrodes to the volume of the ceramic element (i.e., the combined volume of internal electrodes and the ceramic material) is between 0.10 and 0.30.

By satisfying the foregoing requirements, it becomes possible to suppress delamination and cracking from occurring during the sintering process, to improve thermal shock resistance and to provide a highly reliable laminated ceramic electronic part even when the number of laminated internal electrodes is increased and the thickness of the ceramic layer is reduced.

That is, it becomes possible to reduce the influence of the sintering characteristic of the material of the internal electrode during the sintering process and to prevent delamination and cracking from occurring during the sintering process by controlling the ratio of the thickness of the internal electrode to the thickness of the ceramic layer (thickness of internal electrode/thickness of ceramic layer). It also becomes possible to enhance the strength of the laminated ceramic electronic part against thermal stress and to provide the highly reliable laminated ceramic electronic part by controlling the ratio (volume of internal electrodes/volume of ceramic element) of the total volume of the internal electrodes to the total volume of the ceramic element (i.e., the total volume of internal electrodes and the ceramic material).

The specific nature of the invention, as well as other objects, uses and advantages thereof, will clearly appear from the following description and the from the accompanying drawings.

BRIEF DESCRIPTION OF THE DRAWING(S)

FIG. 1 is a section view showing a structure of a laminated ceramic electronic part (laminated ceramic capacitor) according to one embodiment of the present invention; and FIG. 2 is a section view showing a structure of a prior art laminated ceramic electronic part (laminated ceramic capacitor).

DESCRIPTION OF PREFERRED EMBODIMENT

One preferred embodiment of the present invention will be described below in detail. FIG. 1 is a section view showing a structure of a laminated ceramic electronic part (laminated ceramic capacitor in the present embodiment) according to the embodiment of the invention.

As shown in FIG. 1, the laminated ceramic capacitor is constructed by disposing external electrodes 4a and 4b, which are in electrical contact with a plurality of internal electrodes 2, at opposite ends of a ceramic element (e.g., a capacitor) 3. The internal electrodes 2 are disposed so as to face each other via ceramic layers 1a within a ceramic body 1 and a respective end of each internal electrode 2 is coupled to external electrode 4a or 4b.

Several sample capacitors were formed and their characteristics tested to determine the effect of the present invention. A summary of the results of these tests are set forth in Table 1 below.

As shown in the first column of Table 1, green sheets having a thickness after sintering of either 9.8 μm, 6.2 μm or 4.3 μm, were used. For example, green sheets having a thickness of 9.8 μm were used for the first sample 1. After the green sheets were formed, conductive paste for forming the internal electrode was printed on one surface of the green sheets. The thickness of each internal electrode for the respective sample is indicated in Table 1. Then, after laminating and compressing them such that a number of lamination of the electrodes turns out to be 200, 200 laminations were compressed together and cut into a predetermined size (length L=3.2 mm, width W=1.6 mm) to obtain laminates (non-sintered ceramic element).

After heat treating the ceramic element under predetermined conditions to degrease and sinter it, conductive paste for forming the external electrode was applied to opposite ends of the sintered ceramic element. Final, the ceramic element with the conductive paste applied to its ends was sintered to form the external electrodes and the laminated ceramic capacitor as shown in FIG. 1 was produced.

The characteristics of each of the sample laminated ceramic capacitors were tested to determine the value of electrostatic capacity, the value of insulation resistance, the incidence of delamination, the incidence of cracking on the surface of the ceramic element during sintering and the incidence of cracking (incidence of thermal shock crack) when a thermal shock (_T=350° C.) is applied to the samples. Table 1 shows the results of these tests.

Electrostatic Capacity, Insulation Resistance: n=100

Incidence of Delamination and Cracking: n=500

Incidence of Cracking due to Thermal Shock: n=500

As shown in Table 1, it has been confirmed that while (1) the value of electrostatic capacity is small in Sample No. 1 whose ratio of the thickness of the internal electrode is below that of the scope of the invention (0.10 to 0.40), (2) the value of insulation resistance is small in Sample No. 11 whose ratio of the thickness of the internal electrode exceeds that of the scope of the invention, and (3) the incidences of delamination, cracking and cracking due to thermal shock are high in Sample Nos. 5, 10, 15 and 16 whose ratio of the volume of the internal electrode exceeds that of the scope of the invention (0.10 to 0.30), the samples within the scope of the invention which satisfy the requirements of that the ratio of the thickness of the internal electrode to that of the ceramic layer (thickness of internal electrode/thickness of ceramic layer) is between 0.10 and 0.40 and the ratio of the volume of the internal electrode to the volume of the ceramic element (volume of internal electrode/volume of ceramic element) is between 0.10 and 0.30 can obtain characteristics which are practically no problem with respect to the values of electrostatic capacity and of insulation resistance, cause no delamination nor cracking during the sintering process and cause no cracking due to thermal shock.

It is noted that while the present embodiment has been explained by exemplifying a laminated ceramic capacitor, the present invention is applicable not only to laminated

TABLE 1

|   | Thickness of Ceramic Layer (μm) | Thickness of Internal Electrode (μm) | Ratio of Thickness of Internal Electrode (—) | Ratio of Volume of Internal Electrode (—) | Value of Electrostatic Capacity (μF) | Value of Insulation Resistance log IR | Incidence of Delamination (%) | Incidence of Cracking (%) | Incidence of Thermal Shock Cracking (%) |
|---|---|---|---|---|---|---|---|---|---|
| *1  | 9.8 | 0.68 | 0.06 | 0.075 | 1.81 | 12.01 | 0.00 | 0.00 | 0.00 |
| 2   | 9.8 | 0.99 | 0.10 | 0.100 | 2.25 | 12.00 | 0.00 | 0.00 | 0.00 |
| 3   | 9.8 | 1.13 | 0.15 | 0.112 | 2.37 | 11.98 | 0.00 | 0.00 | 0.00 |
| 4   | 9.8 | 1.97 | 0.20 | 0.186 | 2.43 | 11.87 | 0.00 | 0.00 | 0.00 |
| *5  | 9.8 | 2.50 | 0.26 | 0.307 | 2.23 | 11.98 | 0.33 | 1.35 | 2.13 |
| *6  | 6.2 | 0.58 | 0.09 | 0.095 | 2.78 | 11.53 | 0.00 | 0.00 | 0.00 |
| 7   | 6.2 | 0.87 | 0.14 | 0.135 | 3.54 | 11.25 | 0.00 | 0.00 | 0.00 |
| 8   | 6.2 | 1.15 | 0.19 | 0.172 | 3.42 | 11.15 | 0.00 | 0.00 | 0.00 |
| 9   | 6.2 | 1.87 | 0.31 | 0.257 | 3.15 | 11.01 | 0.00 | 0.01 | 0.00 |
| *10 | 6.2 | 2.40 | 0.38 | 0.310 | 3.07 | 11.07 | 0.53 | 0.97 | 0.54 |
| *11 | 4.3 | 0.41 | 0.95 | 0.103 | 3.98 | 10.10 | 0.00 | 0.00 | 0.00 |
| 12  | 4.3 | 0.71 | 0.16 | 0.170 | 4.54 | 10.93 | 0.00 | 0.00 | 0.00 |
| 13  | 4.3 | 0.97 | 0.23 | 0.200 | 4.95 | 11.25 | 0.00 | 0.00 | 0.00 |
| 14  | 4.3 | 1.23 | 0.29 | 0.210 | 5.01 | 10.98 | 0.00 | 0.00 | 0.00 |
| *15 | 4.3 | 1.65 | 0.41 | 0.310 | 4.99 | 10.33 | 0.13 | 0.52 | 1.58 |
| *16 | 4.3 | 2.40 | 0.56 | 0.390 | 4.83 | 10.54 | 0.97 | 1.35 | 3.51 |

It is noted that in Table 1, those samples marked with * fall outside the scope of the present invention (comparative examples) and the other samples fall within the scope of the invention.

The "Ratio of Thickness of Internal Electrode" is the ratio of the individual thickness of the internal electrode to each individual thickness of each ceramic layer (thickness of internal electrode/thickness of ceramic layer) and the "Ratio of Volume of Internal Electrode" is the ratio of the volume of the internal electrodes to the total volume of the ceramic element (i.e., the total volume of the internal electrodes and the ceramic layer)

Further, the number of samples (n) evaluated to determine the various characteristics shown were as follows in Table 1.

ceramic capacitors but also to various laminated ceramic electronic parts such as a laminated varistor having the structure in which a plurality of internal electrodes are disposed so as to overlap each other via ceramic layers within the ceramic element.

The present invention is not limited to the embodiment described above also in other points. That is, it is possible to add various applications and modifications thereto within the scope of the invention with respect to the thickness of the ceramic layer, the number of lamination of the internal electrodes, the rate of the thickness of the internal electrode to that of the ceramic layer, the rate of the volume of the internal electrode to that of the ceramic element and the like.

In accordance with the present invention is it possible to suppress delamination and cracking from occurring during the sintering process even when the number of internal electrodes is increased and the thickness of the ceramic layer is reduced and to provide the highly reliable laminated ceramic electronic part which excels in its thermal shock resistance.

While the preferred embodiment has been described, variations thereto will occur to those skilled in the art within the scope of the present inventive concept which is delineated by the following claim.

What is claimed is:

1. A laminated ceramic electronic part having a plurality of ceramic layers with internal electrodes located therebetween, said internal electrodes overlapping each other via respective ceramic layers, said internal electrodes and said ceramic layers defining a ceramic element, said internal electrodes being electrically coupled to respective terminals on respective opposite sides of said ceramic element; said laminated ceramic electronic part satisfying the following requirements:
   (a) the thickness of each said ceramic layer is 10 $\mu$m or less;
   (b) the number of said internal electrodes is 200 or more;
   (c) the ratio of the thickness of each said internal electrode to the thickness of each said ceramic layer is 0.10 to 0.40; and
   (d) the ratio of the combined volume of said internal electrodes to the total volume of said ceramic element is 0.10 to 0.30.

2. A laminated ceramic electronic part, comprising:
   (a) a ceramic element including:
      (1) a plurality of overlapping internal electrodes;
      (2) a plurality of internal ceramic layers located between respective pairs of said overlapping internal electrodes;
      (3) upper and lower ceramic layers located above and below the uppermost and lowermost ones of said overlapping internal electrodes, respectively;
   (b) a pair of external electrodes formed on at least one outer surface of said ceramic element, each of said overlapping internal electrodes being electrically coupled to a respective external electrode;
   (c) said ceramic element satisfying the requirements:
      (1) the thickness of each said internal ceramic layer is 10 $\mu$m or less;
      (2) the number of said internal electrodes is 200 or more;
      (3) the ratio of the thickness of each said internal electrode to the thickness of each said internal ceramic layer is 0.10 to 0.40; and
      (4) the ratio of the combined volume of said internal electrodes to the combined volume of said ceramic element is 0.10 to 0.30.

3. A laminated ceramic electronic part, comprising:
   (a) a ceramic element including:
      (1) a plurality of overlapping internal electrodes;
      (2) a plurality of internal ceramic layers located between respective pairs of said overlapping internal electrodes;
      (3) upper and lower ceramic layers located above and below the uppermost and lowermost ones of said overlapping internal electrodes, respectively;
   (b) a pair of external electrodes formed on at least one outer surface of said ceramic element, each of said overlapping internal electrodes being electrically coupled to a respective external electrode;
   (c) said ceramic element satisfying the requirements:
      (1) the thickness of each said internal ceramic layer is 10 $\mu$m or less;
      (2) the number of said internal electrodes is 200 or more;
      (3) the ratio of the average thickness of each said internal electrode to the average thickness of each said internal ceramic layer is 0.10 to 0.40; and
      (4) the ratio of the combined volume of said internal electrodes to the combined volume of said ceramic element is 0.10 to 0.30.

* * * * *

(12) EX PARTE REEXAMINATION CERTIFICATE (9093rd)
United States Patent
Ueno et al.

(10) Number: US 6,014,309 C1
(45) Certificate Issued: Jun. 26, 2012

(54) LAMINATED CERAMIC ELECTRONIC PARTS

(75) Inventors: Yasushi Ueno, Takefu (JP); Yoshikazu Takagi, Sabae (JP); Kazuaki Kawabata, Fukui (JP); Nagato Omori, Takefu (JP)

(73) Assignee: Murata Manufacturing Co., Ltd., Nagaokakyo, Kyoto-fu (JP)

Reexamination Request:
No. 90/010,781, Dec. 18, 2009

Reexamination Certificate for:
Patent No.: 6,014,309
Issued: Jan. 11, 2000
Appl. No.: 09/075,668
Filed: May 11, 1998

(51) Int. Cl.
*H01G 4/228* (2006.01)
*H01G 4/06* (2006.01)

(52) U.S. Cl. .................. 361/306.3; 361/311; 361/321.2; 361/321.5

(58) Field of Classification Search .................. None
See application file for complete search history.

(56) References Cited

To view the complete listing of prior art documents cited during the proceeding for Reexamination Control Number 90/010,781, please refer to the USPTO's public Patent Application Information Retrieval (PAIR) system under the Display References tab.

*Primary Examiner* — Hetul Patel

(57) ABSTRACT

There is provided a highly reliable laminated ceramic electronic part in which delamination or crack can be suppressed from occurring during a sintering process even if a number of lamination of internal electrodes is increased and a thickness of the ceramic layer is reduced and which excels in thermal shock resistance. The laminated ceramic electronic part is constructed so as to satisfy the following requirements of that a thickness of the ceramic layer is 10 μm or less; a number of lamination of the internal electrodes is 200 or more; a ratio of a thickness of the internal electrode to the thickness of the ceramic layer (thickness of internal electrode/thickness of ceramic layer) is 0.10 to 0.40; and a ratio of a volume of the internal electrode to a volume of the ceramic element (volume of internal electrodes/volume of ceramic element) is 0.10 to 0.30.

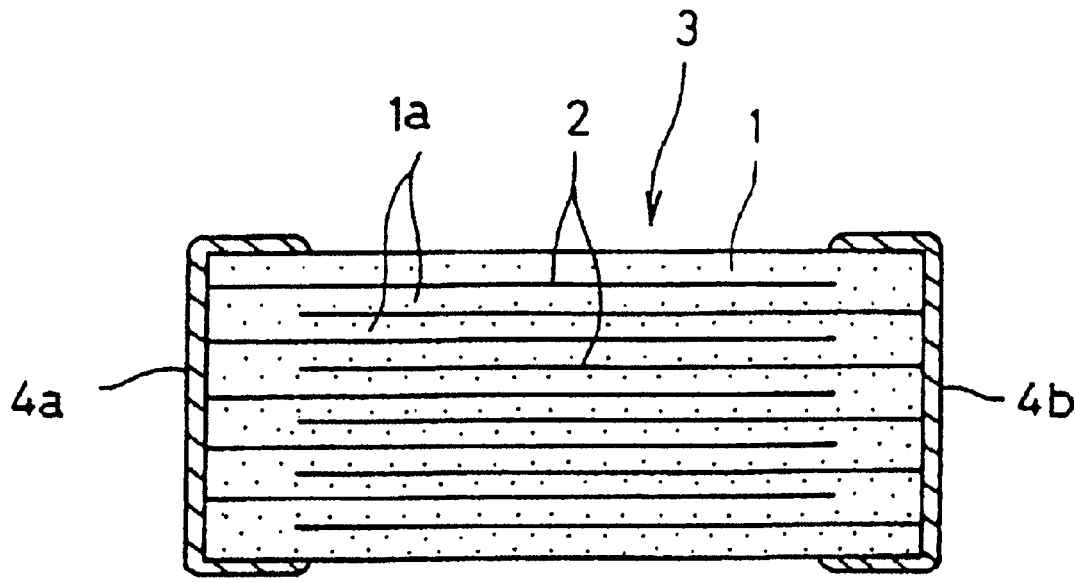

EX PARTE REEXAMINATION CERTIFICATE ISSUED UNDER 35 U.S.C. 307

NO AMENDMENTS HAVE BEEN MADE TO THE PATENT

Figure 1:
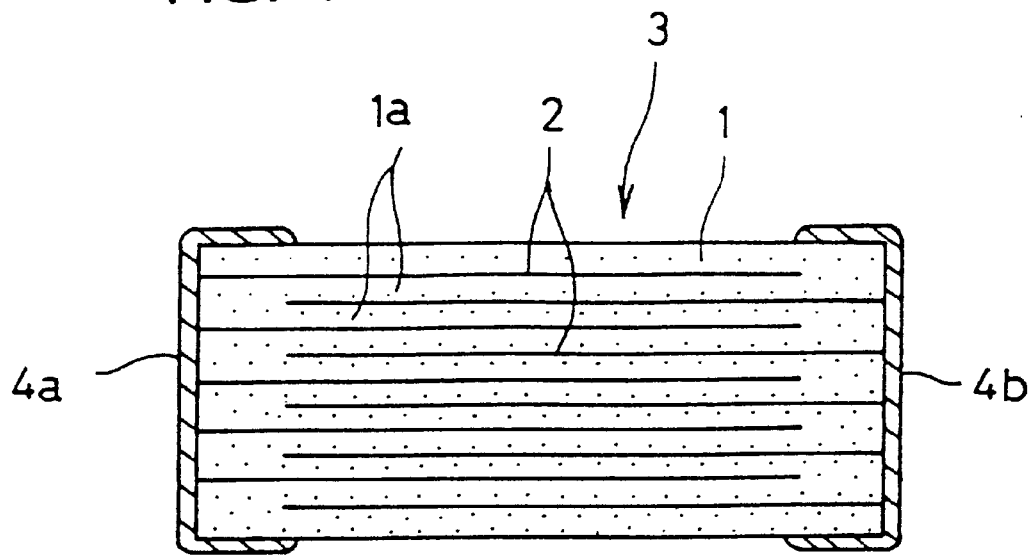
Figure 2:
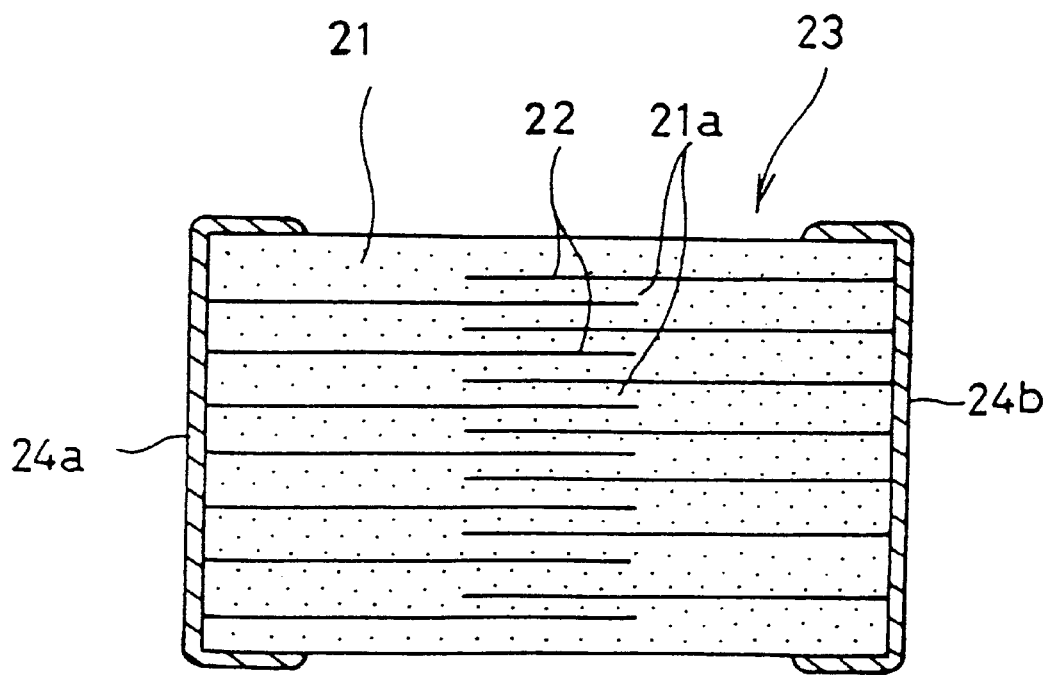

AS A RESULT OF REEXAMINATION, IT HAS BEEN DETERMINED THAT:

The patentability of claims 1-3 is confirmed.

* * * * *